(12) United States Patent
Wilkie

(10) Patent No.: US 7,146,925 B1
(45) Date of Patent: Dec. 12, 2006

(54) APPARATUS FOR VARYING VESSEL HULL GEOMETRY AND VESSELS MADE THEREWITH

(75) Inventor: Geoffrey D. M. Wilkie, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/613,172

(22) Filed: Jul. 3, 2003

Related U.S. Application Data

(60) Provisional application No. 60/442,129, filed on Jan. 24, 2003.

(51) Int. Cl.
*B63B 1/00* (2006.01)
*B63B 7/00* (2006.01)

(52) U.S. Cl. .................. 114/354; 114/56.1; 114/61.1

(58) Field of Classification Search .......... 114/56.1, 114/61.1, 61.25, 61.26, 61.27, 61.28, 352–354, 114/355; 244/97, 98; 52/109; 135/131
See application file for complete search history.

(56) References Cited

U.S. PATENT DOCUMENTS

| | | | | | |
|---|---|---|---|---|---|
| 176,849 | A | * | 5/1876 | Fenner | 114/354 |
| 192,007 | A | * | 6/1877 | Prentice | 114/354 |
| 1,265,195 | A | * | 5/1918 | Hayford | 114/354 |
| 2,351,891 | A | * | 6/1944 | Weisbaum | 273/384 |
| 2,390,747 | A | * | 12/1945 | Straussler | 114/65 R |
| 3,028,612 | A | * | 4/1962 | Sindell | 114/354 |
| 3,110,281 | A | * | 11/1963 | Buck | 114/139 |
| 3,157,145 | A | * | 11/1964 | Farris et al. | 114/332 |
| 3,352,269 | A | * | 11/1967 | Dollison | 114/265 |
| 3,409,253 | A | * | 11/1968 | Berg et al. | 244/135 R |
| 3,710,806 | A | * | 1/1973 | Kelly et al. | 135/145 |
| 3,888,056 | A | * | 6/1975 | Kelly et al. | 52/109 |
| 3,973,370 | A | * | 8/1976 | McAllister | 52/745.08 |
| 4,032,086 | A | * | 6/1977 | Cooke | 244/30 |
| 4,286,539 | A | * | 9/1981 | Pignone | 114/331 |
| 4,328,601 | A | * | 5/1982 | Rodler et al. | 114/353 |
| 4,351,502 | A | * | 9/1982 | Statkus | 244/219 |
| 4,587,777 | A | * | 5/1986 | Vasques et al. | 52/108 |
| 4,715,311 | A | * | 12/1987 | Masters | 114/347 |
| 5,005,783 | A | * | 4/1991 | Taylor | 244/97 |
| 5,024,031 | A | | 6/1991 | Hoberman | 52/81 |
| 5,460,556 | A | * | 10/1995 | Logan et al. | 441/2 |
| 5,499,594 | A | * | 3/1996 | Bullock | 114/354 |
| 5,701,713 | A | * | 12/1997 | Silver | 52/645 |
| 5,706,253 | A | * | 1/1998 | Nedderman, Jr. | 367/153 |
| 6,028,570 | A | * | 2/2000 | Gilger et al. | 343/915 |
| 6,042,052 | A | * | 3/2000 | Smith | 244/105 |
| 6,290,174 | B1 | * | 9/2001 | Gioia | 244/105 |
| 6,619,224 | B1 | * | 9/2003 | Syfritt | 114/352 |

FOREIGN PATENT DOCUMENTS

| | | | |
|---|---|---|---|
| FR | 2590224 A1 | * | 5/1987 |
| FR | 2810624 A1 | * | 12/2001 |

(Continued)

*Primary Examiner*—Ajay Vasudeva
(74) *Attorney, Agent, or Firm*—Simpson & Simpson, PLLC

(57) ABSTRACT

An apparatus for varying the dimensions of a hull of a vessel comprising an arcuate truss assembly having a plurality of members pivotally joined. The arcuate truss assembly is operatively arranged to form a portion of the hull. The assembly is operatively arranged to extend and retract to vary the dimensions of the hull when the plurality of members are pivoted with respect to one another. The members of the arcuate truss assembly pivot in a plane substantially coplanar with the portion of the vessel hull.

24 Claims, 17 Drawing Sheets

FOREIGN PATENT DOCUMENTS

| | | | | |
|---|---|---|---|---|
| GB | 2253594 A | * | 9/1992 | |
| JP | 61166783 A | * | 7/1986 | |
| JP | 06016172 A | * | 1/1994 | |
| JP | 07157977 A | * | 6/1995 | |
| JP | 2002191722 A | * | 7/2002 | |

* cited by examiner

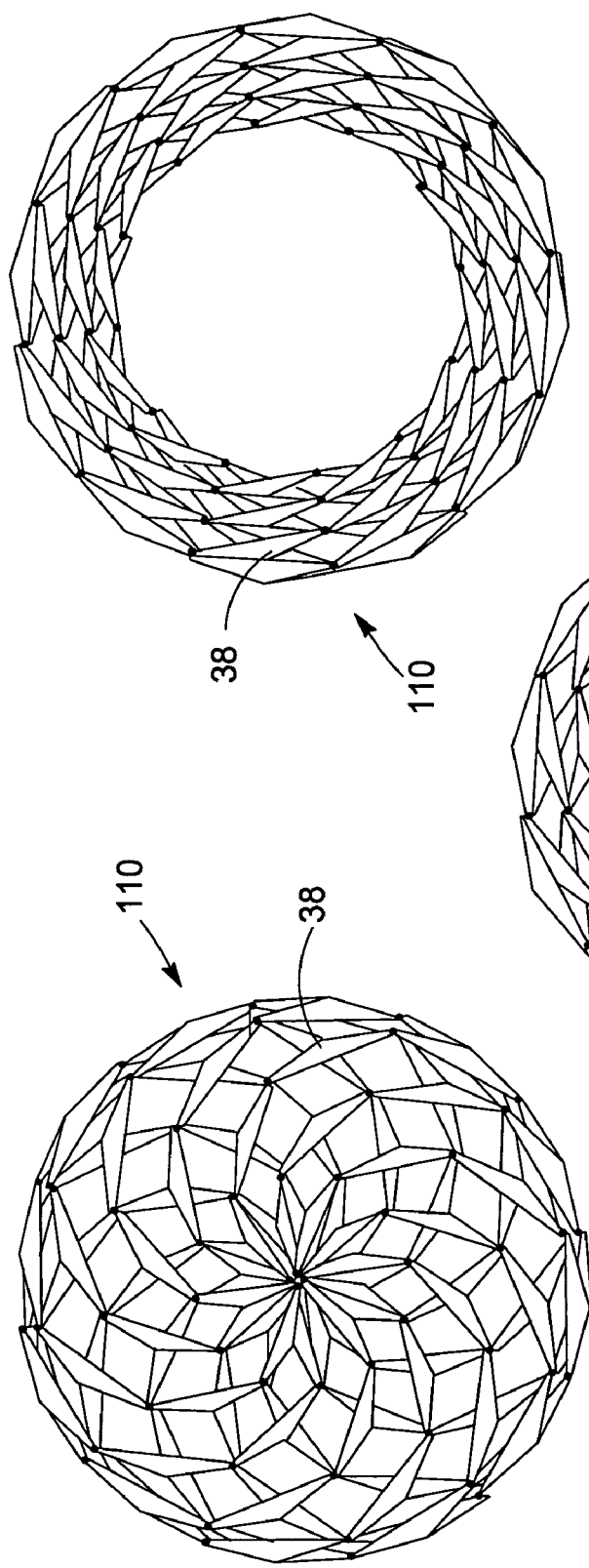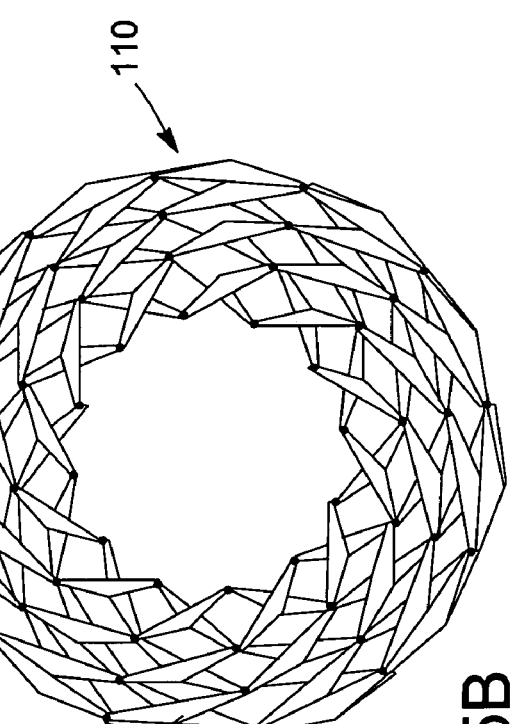
Fig. 5A
Fig. 5B
Fig. 5C

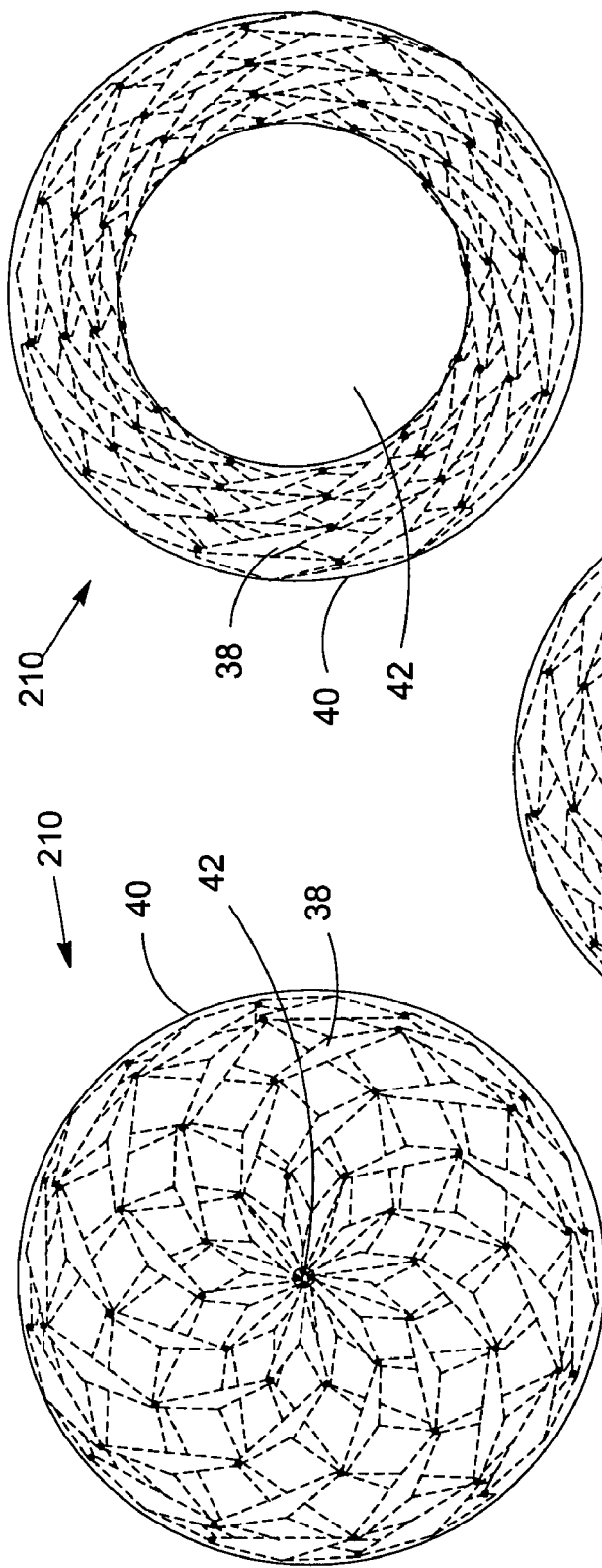
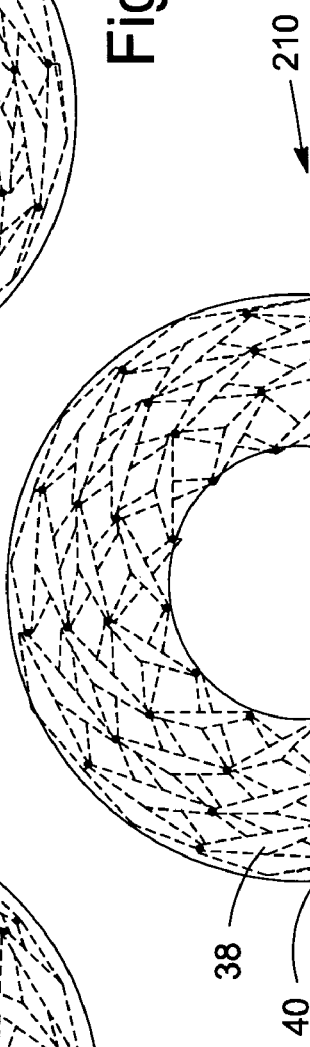
Fig. 6A
Fig. 6B
Fig. 6C

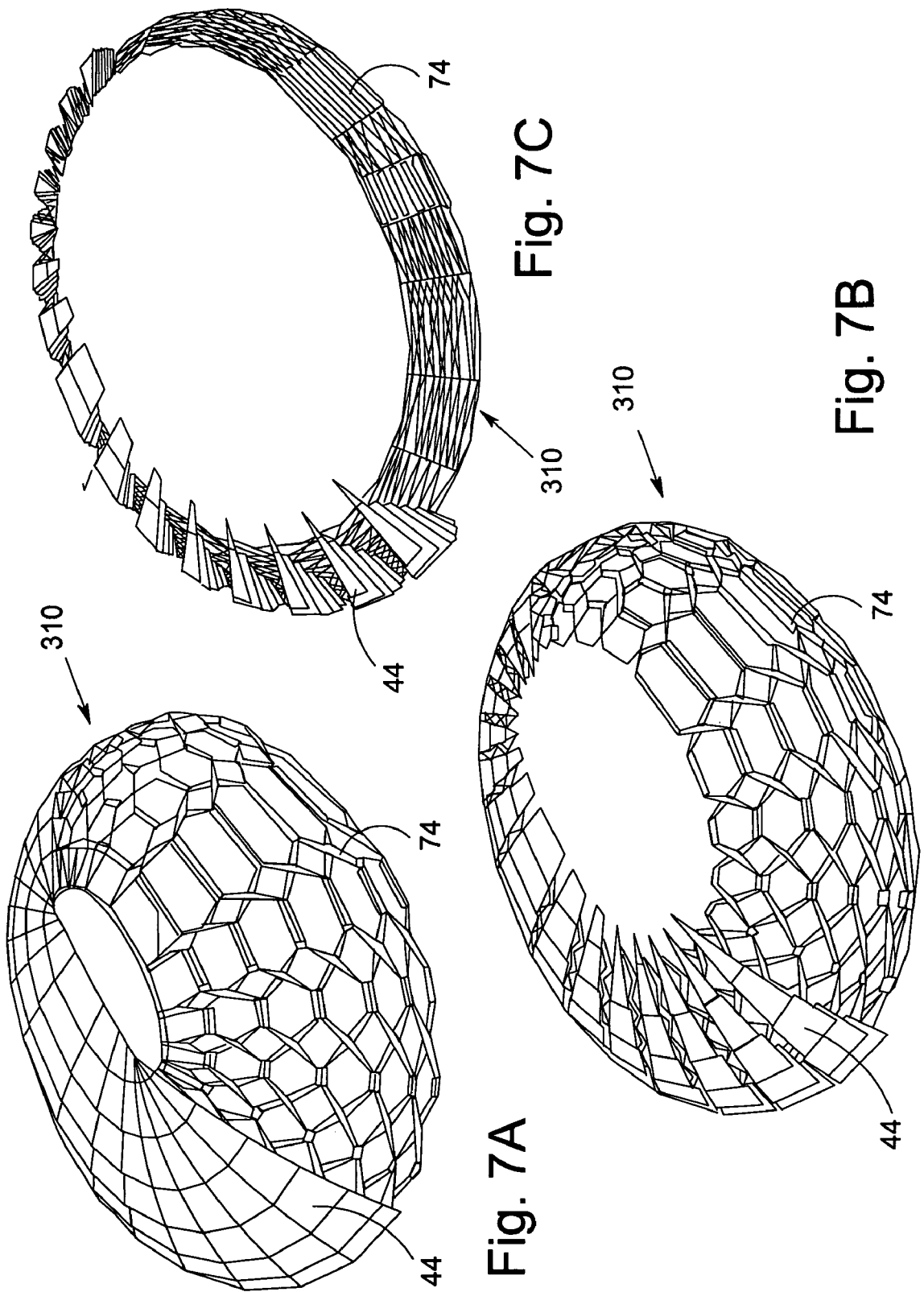

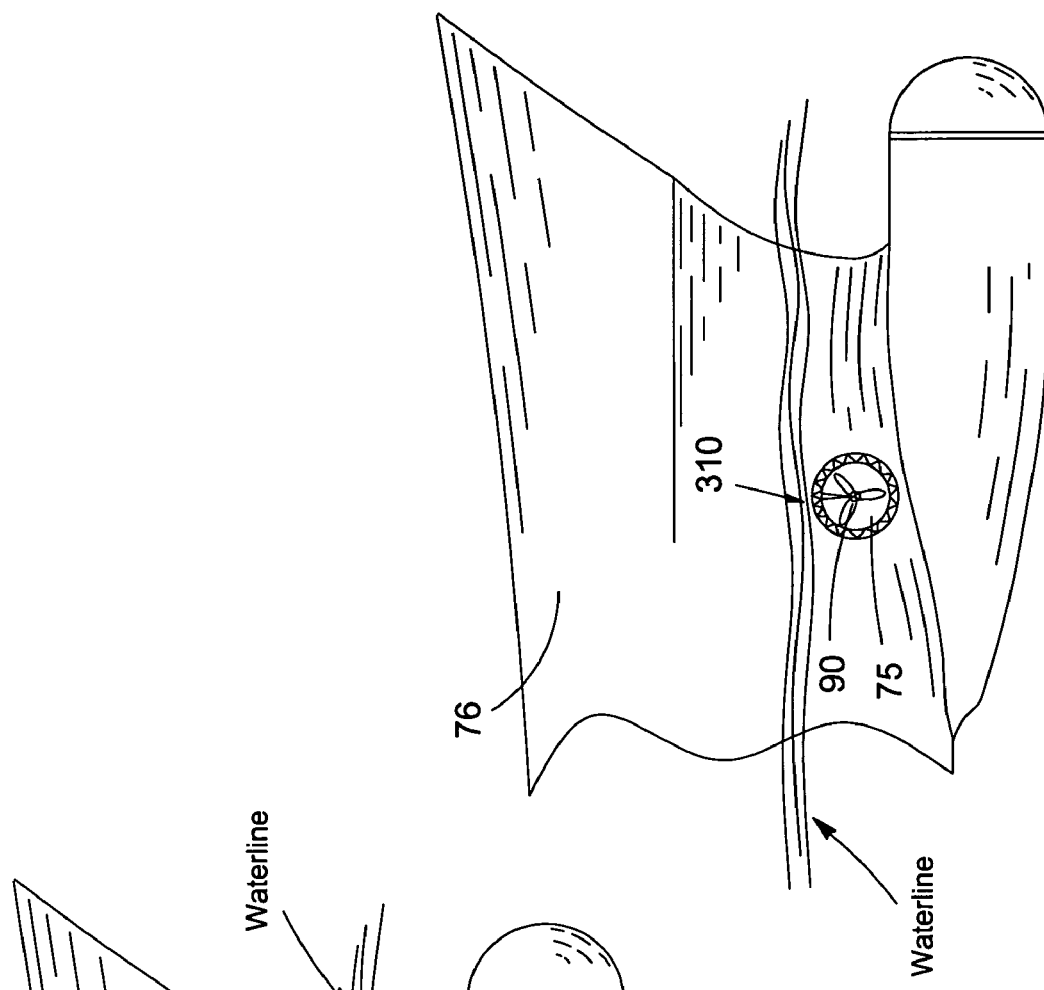
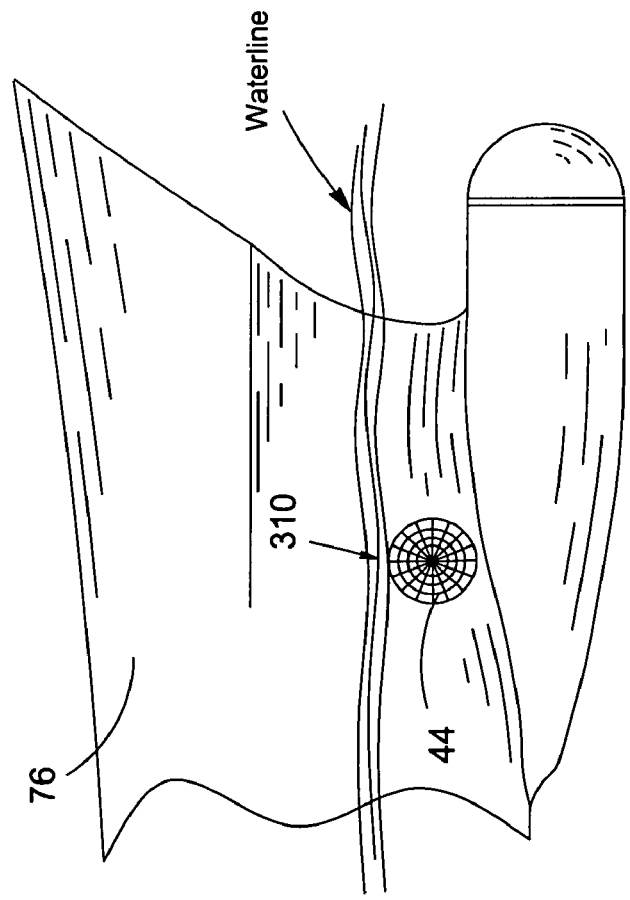
Fig. 9A
Fig. 9B

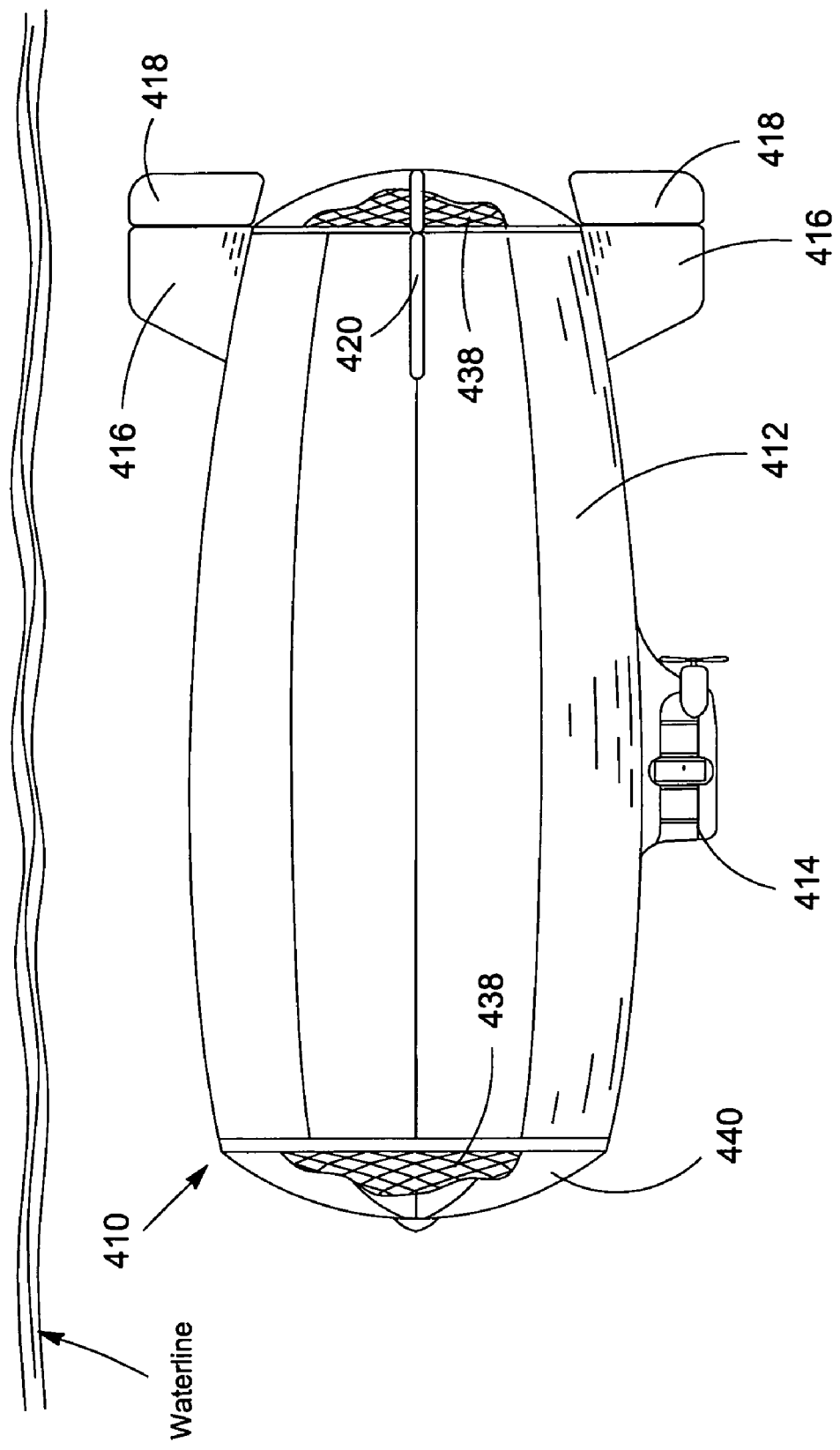

APPARATUS FOR VARYING VESSEL HULL GEOMETRY AND VESSELS MADE THEREWITH

CROSS-REFERENCE TO RELATED APPLICATIONS

This application claims the benefit under 35 U.S.C. §119(e) of U.S. Provisional Application No. 60/442,129, filed Jan. 24, 2003.

FIELD OF THE INVENTION

This invention relates to the construction of vessels. More specifically it relates to an apparatus for the construction of vessels having variable sized hulls. Even more specifically, the present invention relates to a vessel having a hull whose size and shape can be modified without refitting the vessel.

BACKGROUND OF THE INVENTION

Waterborne and submersible vessels are typically constructed having a hull of fixed dimensions. This fixes various characteristics of the vessel, such as the capacity, maneuverability, and stability of the vessel. If a vessel owner wishes to modify any of these characteristics, a major overhaul is typically required. This typically involves significant cost in resources and time.

Clearly, then, there is a longfelt need for a vessel having a hull with variable dimensions.

SUMMARY OF THE INVENTION

The present invention broadly comprises a method and apparatus for varying the dimensions of a vessel hull comprising an assembly having a plurality of members pivotally joined. The assembly is operatively arranged to form a portion of the vessel hull. The assembly is operatively arranged to extend and retract to vary the dimensions of the hull when the plurality of members are pivoted with respect to one another.

A general object of the present invention is to provide an apparatus for varying the dimensions of a vessel hull.

Another object of the present invention is to change the carrying capacity, buoyancy, maneuverability, stability, and/or resistance of the vessel.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which:

FIG. 5A is a top view of a second embodiment of the present invention, in a fully extended configuration;

FIG. 5B is a top view of the second embodiment of the present invention, in a partially extended configuration;

FIG. 5C is a top view of the second embodiment of the present invention, in a fully retracted configuration;

FIG. 6A is a top view of a third embodiment of the present invention covered by a membrane, in a fully extended configuration;

FIG. 6B is a top view of the third embodiment of the present invention covered by a membrane, in a partially extended configuration;

FIG. 6C is a top view of the third embodiment of the present invention covered by a membrane, in a fully retracted configuration;

FIG. 7A is a top view of a fourth embodiment of the present invention covered by a plurality of plates, in a fully extended configuration;

FIG. 7B is a top view of the fourth embodiment of the present invention covered by a plurality of plates, in a partially extended configuration;

FIG. 7C is a top view of the fourth embodiment of the present invention covered by a plurality of plates, in a fully retracted configuration;

FIG. 9A is a side view of a fifth embodiment of the present invention mounted on a portion of a floatable vessel hull and fully extended;

FIG. 9B is a side view of the fifth embodiment of the present invention mounted on a portion of a floatable vessel hull and fully extended;

FIG. 11 is a side view of the sixth embodiment with the assemblies of the present invention fully retracted;

DETAILED DESCRIPTION OF THE PREFERRED EMBODIMENT

It should be appreciated that, in the detailed description of the invention which follows, like reference numbers on different drawing views are intended to identify identical structural elements of the invention in the respective views.

Figure 1:
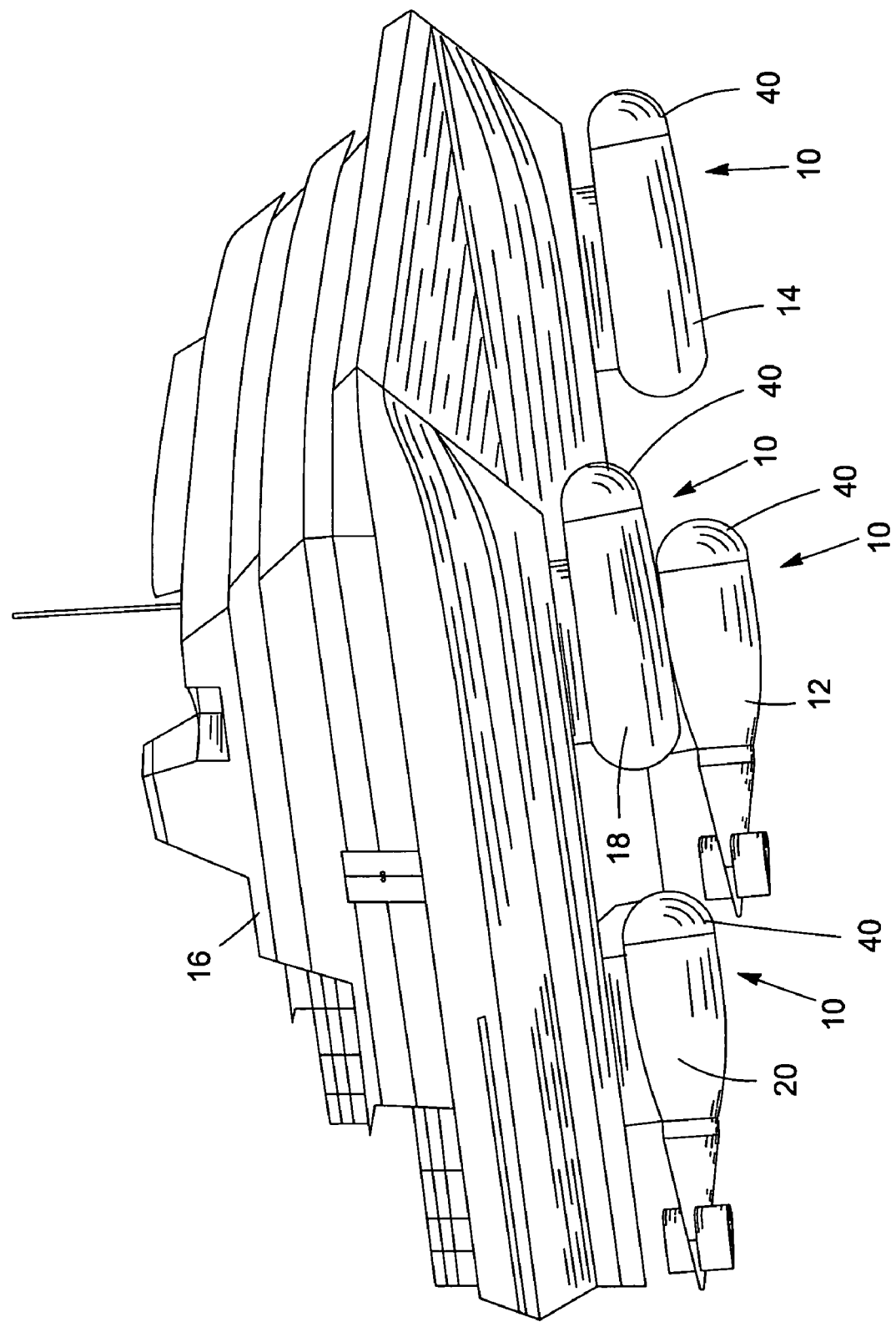
FIG. 1 is a perspective view of a first embodiment of the present invention installed integral with a vessel hull of a floatable vessel.
Figure 4B:
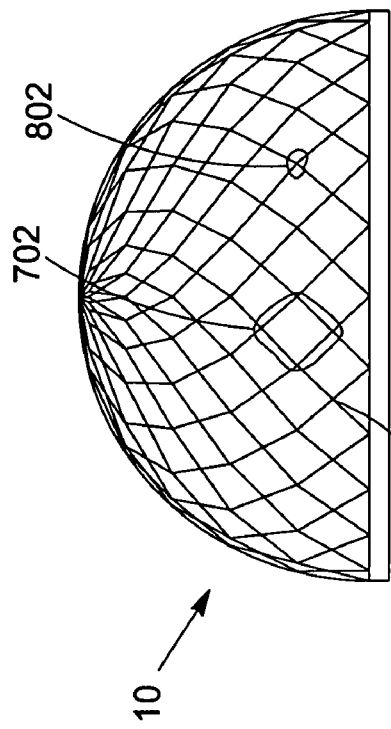
FIG. 4B is a side view of the assembly of the present invention in an extended configuration, having a membrane attached to an inner portion.
Figure 4D:
FIG. 4D is a side view of the assembly of the present invention in an extended configuration, covered by a membrane.

A first embodiment of the present invention is shown in FIG. 1 and designated 10. The invention comprises an assembly for changing the dimensions of a vessel hull. The assembly may be a radial extension/retraction truss structure as disclosed by U.S. Pat. No. 5,024,031 (Hoberman), incorporated by reference herein. As shown in FIG. 1, the assemblies are mounted on hull sections 12, 14, 18, and 20 of vessel 16. The assemblies are covered by membrane 40, and are not visible in FIG. 1. FIG. 4B shows assembly 38 in an extended configuration with the membrane not shown. FIG. 4D shows extended assembly 38 beneath a cutaway of membrane 40.

It should be readily apparent to one skilled in the art that the assemblies of the present invention can be extended and retracted by pneumatic, hydraulic, microelectromechanical systems (MEMS), or any other means known in the art. Assemblies actuated by any means known in the art are intended to be within the spirit and scope of the invention as claimed.

Figure 2:
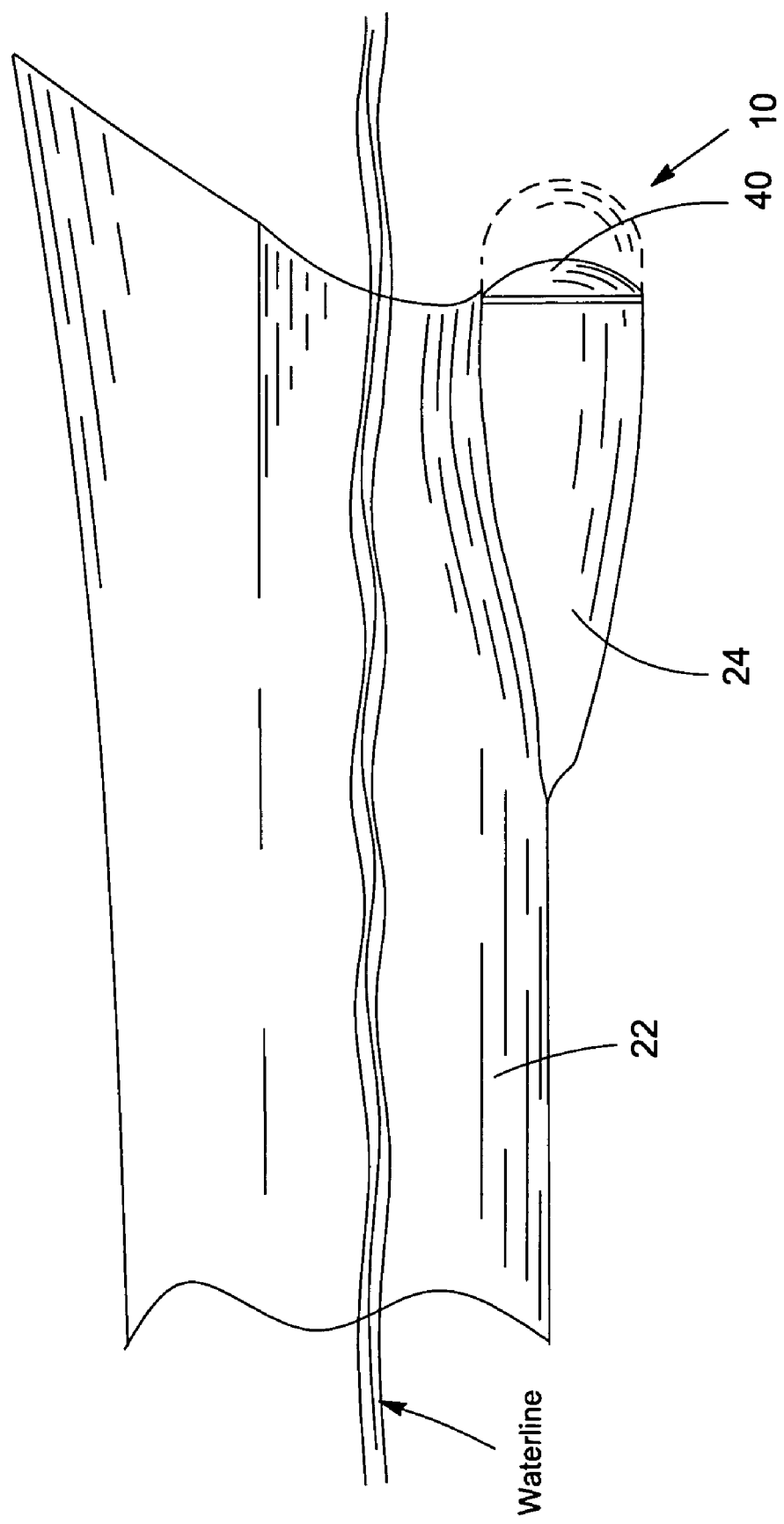
FIG. 2 is a side view of the present invention installed integral with a hull of a floatable vessel.

FIG. 2 shows portion 22 of a hull of a vessel having hull extension 24. Apparatus 10 is located on the forward section of hull extension 24. Membrane 40 is shown covering the assembly of the present invention. The membrane is shown in solid lines for a fully retracted configuration of the assembly and in broken lines for a fully extended configuration of the assembly.

Figure 3A:
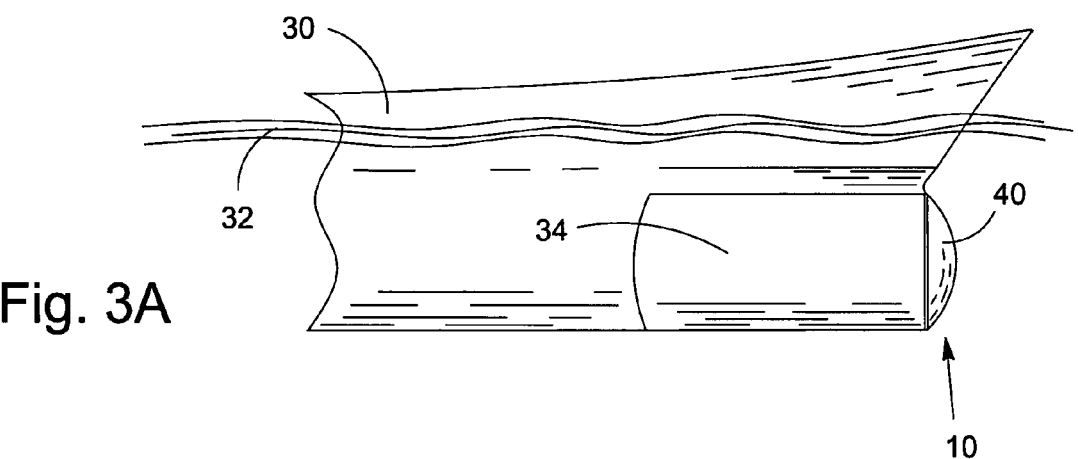
FIG. 3A is a side view of the present invention, mounted on a portion of a hull of a floatable vessel, in a retracted configuration.
Figure 3B:
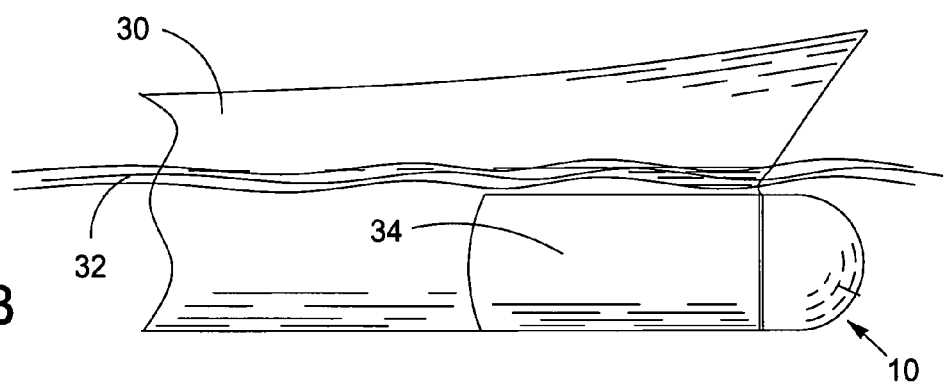
FIG. 3B is a side view of the present invention, mounted on a portion of a hull of a floatable vessel, in an extended configuration.

FIGS. 3A and 3B illustrate the buoyancy gain realized by the vessel when the membrane is sealed to the hull with a watertight seal. Membrane 40 is shown covering the assembly in the fully retracted position in FIG. 3A. Membrane 40 is connected to hull portion 34. The waterline 32 is relatively high with respect to hull 30. FIG. 3B shows membrane 40 covering the assembly in a fully extended configuration. The expansion of the vessel volume below the waterline 32 increases the buoyancy of the vessel. This leads to the vessel rising in the water. Thus, waterline 32 is relatively lower on hull 30.

In addition, the expansion and contraction of the assembly will change the magnitude of the wave-making drag created by the hull moving through the water (corresponding to the change in the Froude number). Thus, in some applications, the extent to which the assembly is extended or contracted may be determined by the optimal Froude number (the Froude number resulting in minimum drag for a desired speed) resulting from the assembly size, rather than the buoyancy created by the assembly size.

The watertight embodiment shown in FIGS. 3A and 3B may also be used to compensate for vessel internal (payload) or external environmental moments by extending the different assemblies shown in FIG. 1 to different configurations. If each assembly is extended to a different configuration, each of the assemblies creates a different amount of buoyancy. This allows the operator of the vessel to rebalance the vessel for loading or unloading, passenger crowding, turning, wind, and icing, for example.

FIGS. 3A and 3B show an embodiment that varies the hull geometry while maintaining a watertight seal, thus changing the buoyancy of the hull. However, a watertight seal is not necessary. The apparatuses 10 in FIG. 1 may be mounted on watertight hull portions, which would fix the buoyancy of the vessel. A membrane or plurality of plates would still be necessary to substantially inhibit the free flow of fluid through the apparatus 10. In this case, the extension and contraction of the assembly would serve only to change the Froude number, changing the magnitude of the drag created. In this case, the configuration of the assembly would be determined solely by the optimal Froude number (the Froude number that minimizes drag at the desired speed). Configurations of the present invention either with a watertight seal or without a watertight seal are both within the spirit and scope of the invention as claimed.

Figure 4A:
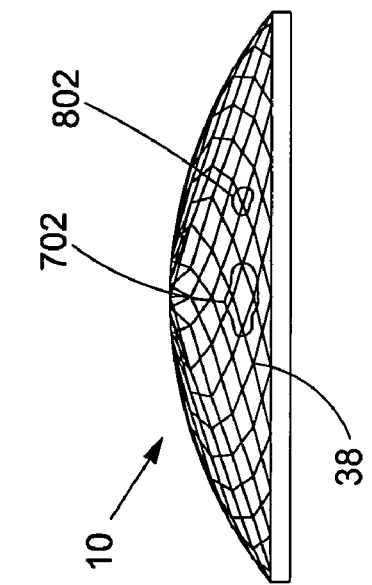
FIG. 4A is a side view of the assembly of the present invention in a retracted configuration.
Figure 4C:
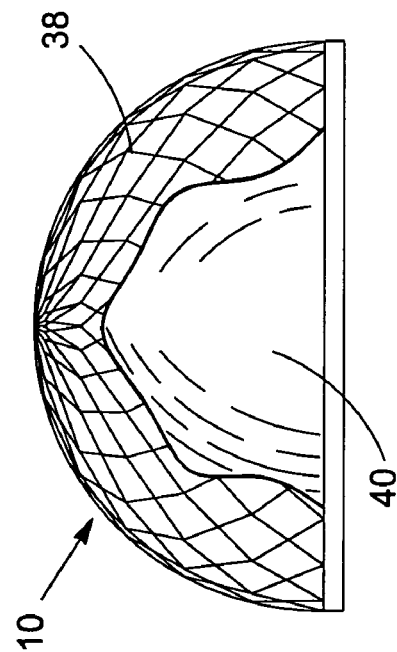
FIG. 4C is a side view of the assembly of the present invention in an extended configuration.

FIGS. 1–3 show a membrane covering the assembly of the present invention. However, the membrane may be connected to an inner portion of the assembly, exposing the assembly to the water. In either case, the membrane may be connected to the hull with a watertight seal. FIG. 4A shows assembly 38 in a retracted position. In one embodiment, membrane 40 is connected to an inner portion of assembly 38, such that it expands as assembly 38 extends (shown in FIG. 4C). It should be readily apparent to one skilled in the art that a membrane may be located within the assembly, covering the assembly, or a membrane may be located both inside the assembly and covering the assembly, and these modifications are intended to be within the spirit and scope of the invention as claimed.

A second exemplary embodiment of the present invention is shown in FIGS. 5A–5C and designated 110. This embodiment is an assembly similar in operation to a diaphragm shutter on a camera. This assembly covers an aperture in the hull when fully extended, and exposes the aperture in the hull when fully retracted. FIG. 5A shows assembly 38 in a fully extended configuration. FIG. 5B shows the assembly in a partially extended configuration. FIG. 5C shows the assembly in a fully retracted configuration.

The assembly may be covered by a flexible membrane, as illustrated in FIGS. 6A–6C. FIG. 6A shows embodiment 210 comprising fully extended assembly 38 covered by membrane 40. Membrane 40 has an aperture 42 in the center, which is substantially closed when the assembly is fully extended. FIG. 6B shows assembly 38 partially retracted, opening aperture 42. FIG. 6C shows assembly 38 fully retracted, opening aperture 42 to its widest extent.

In embodiment 310, a non-circular assembly 74 is covered with plates as shown in FIGS. 7A–7C. FIG. 7A shows embodiment 310 comprising fully extended assembly 74 partially covered by a plurality of plates 44. When assembly 74 is retracted, plates 44 are also retracted, forming an aperture. FIG. 7B shows assembly 74 partially retracted, with the plurality of plates partially retracted. FIG. 7C shows assembly 74 fully retracted, retracting plates 44 to their greatest extent. As should be readily apparent to one skilled in the art, other means of covering a diaphragm shutter assembly are possible, and these modifications are intended to be within the spirit and scope of the invention as claimed. For example, the plates or membrane may or may not be watertight when the assembly is fully extended. A watertight seal is not required for an aperture such as a bow thruster, as there is a watertight seal within the aperture. The present invention would serve to decrease drag when it is fully extended and the vessel is moving. However, the present invention could serve to both reduce drag and provide a watertight seal for an aperture in a vessel hull.

Figure 8A:
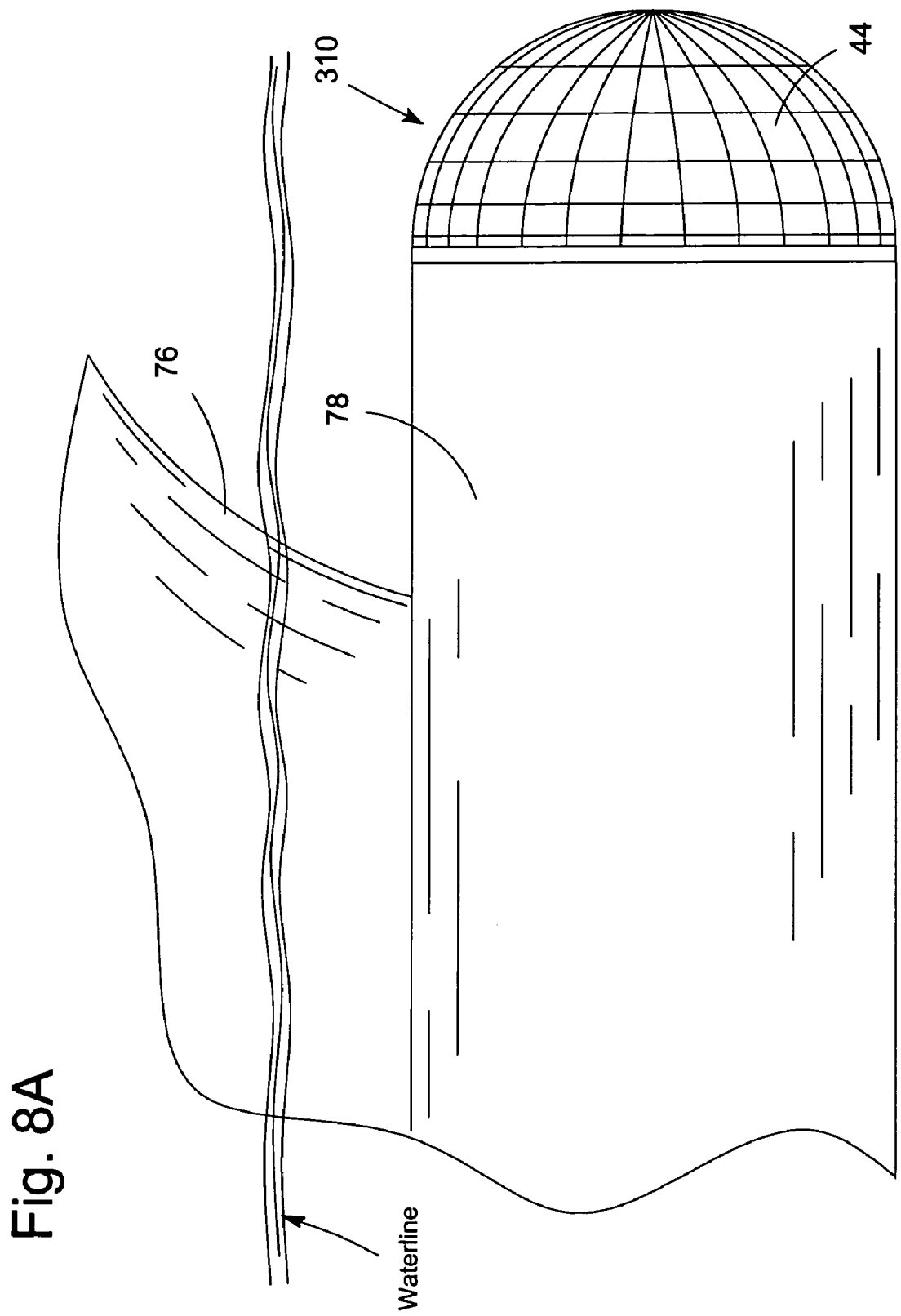
FIG. 8A is a side view of the fourth embodiment of the present invention mounted on a portion of a floatable vessel hull and fully extended.
Figure 8B:
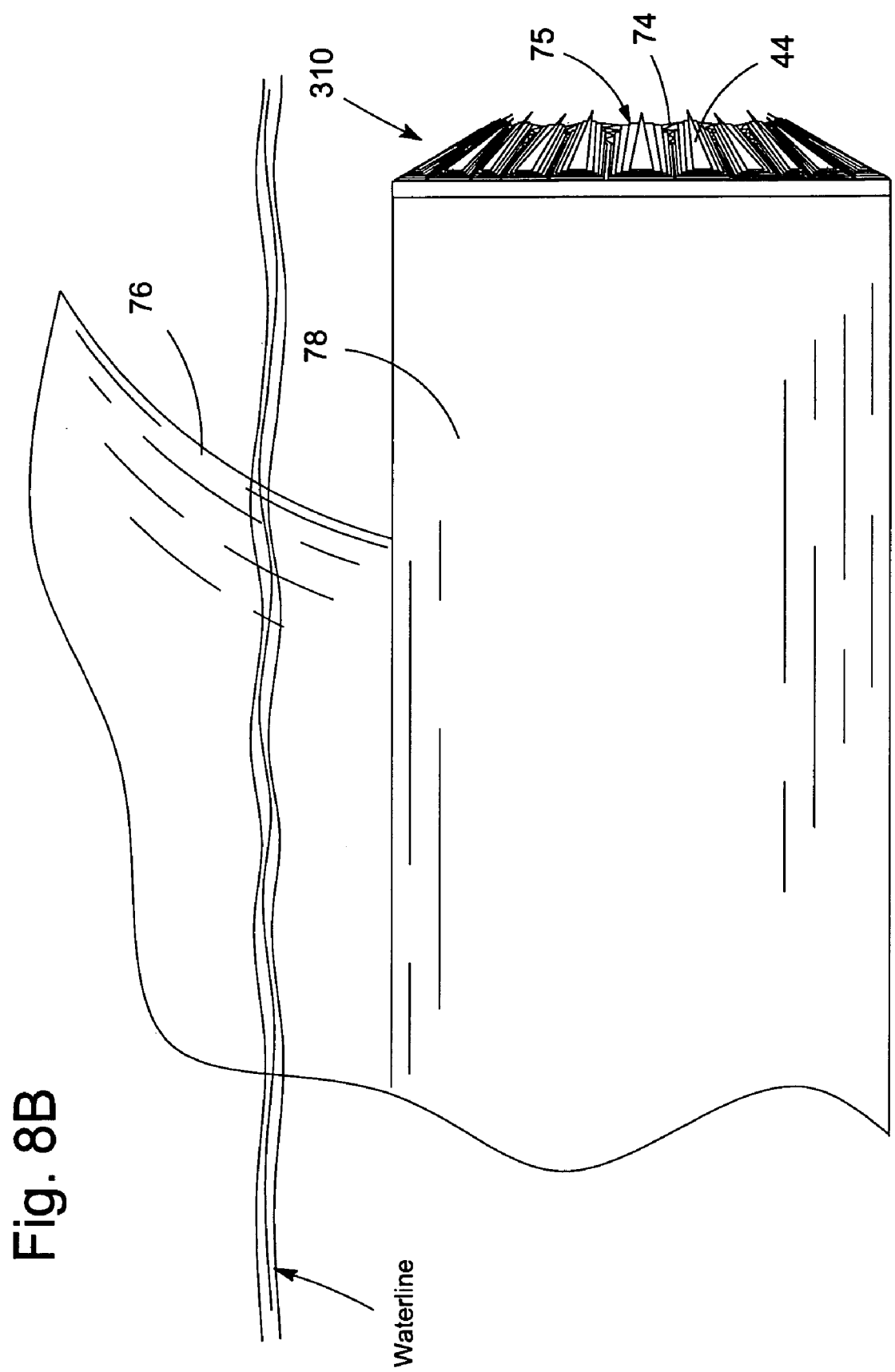
FIG. 8B is a side view of the fourth embodiment of the present invention mounted on a portion of a floatable vessel hull and fully extended.

FIG. 8A shows a diaphragm shutter assembly mounted on hull portion 78 of hull 76. FIG. 8B shows assembly 74 fully retracted, forming aperture 75. Aperture 75 faces the forward direction of the hull. This embodiment may be used to cover, for example, a torpedo tube. However, any aperture in a hull may be covered in this manner.

FIGS. 9A and 9B illustrate a fifth exemplary embodiment of the present invention. Hull 76 comprises apparatus 310. Apparatus 310 is a diaphragm shutter assembly covered by plates 44. Apparatus 310 covers an aperture in hull 76 containing bow thruster 90. When bow thruster 90 is needed to maneuver the vessel, apparatus 310 is retracted to reveal aperture 75. When the bow thruster is no longer needed, apparatus 310 is extended to cover aperture 75, reducing the drag that would result from exposing aperture 75 during normal travel. An aperture for a water-jet, turbine, or any other aperture in a hull may be covered by apparatus 310 in a similar fashion.

It should be readily apparent to one skilled in the art that the present invention may be used to vary the geometry of hulls of both waterborne and submersible vessels. Variable hulls for both waterborne and submersible vessels are intended to be within the spirit and scope of the invention as claimed. In addition, the invention could be used to vary the geometry of aircraft, including, for example, airships. FIGS. 10–15 illustrate the use of the present invention to vary the dimensions of aircraft.

Figure 10:
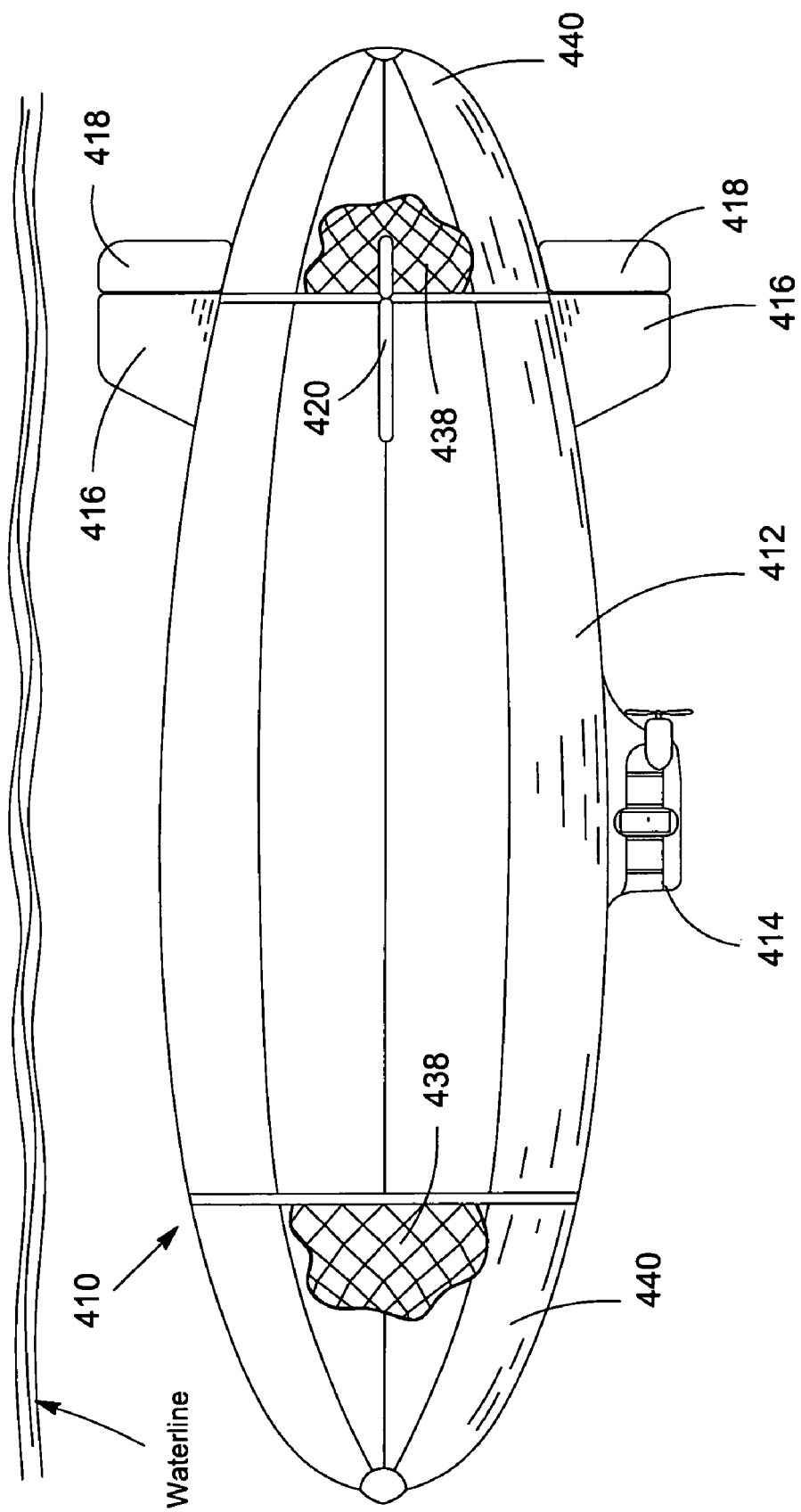
FIG. 10 is a side view of a sixth embodiment of the present invention mounted on a portion of a hull of a submersible vessel.

FIG. 10 shows vessel 412 having passenger compartment 414. A variable hull section 410 is connected to the front and the back of the vessel. Assembly 438 (shown beneath a cutaway) is covered by flexible membrane 440. Assembly 438 expands and contracts to change the dimensions of the hull of the vessel. (Both front and rear assemblies are shown fully extended in FIG. 10.) Fins 416, 420, and 418 are constructed to allow assembly 438 to expand and contract while the fins are moved to any position. Vessel 412 can be an airship or a submersible.

FIG. 11 shows the front and rear assemblies fully contracted. This reduces the displacement of fluid by the vessel. As with the previously discussed embodiments, there can be a flexible membrane over the assembly, within the assembly, or both over the assembly and within the assembly. The membrane may be used to contain a fluid less dense than the intended environment, or may simply bound the interior of the vessel. (In the latter case, a less dense internal fluid is held in containers within the hull of the aircraft.) All of the above embodiments are within the spirit and scope of the invention as claimed.

Figure 13:
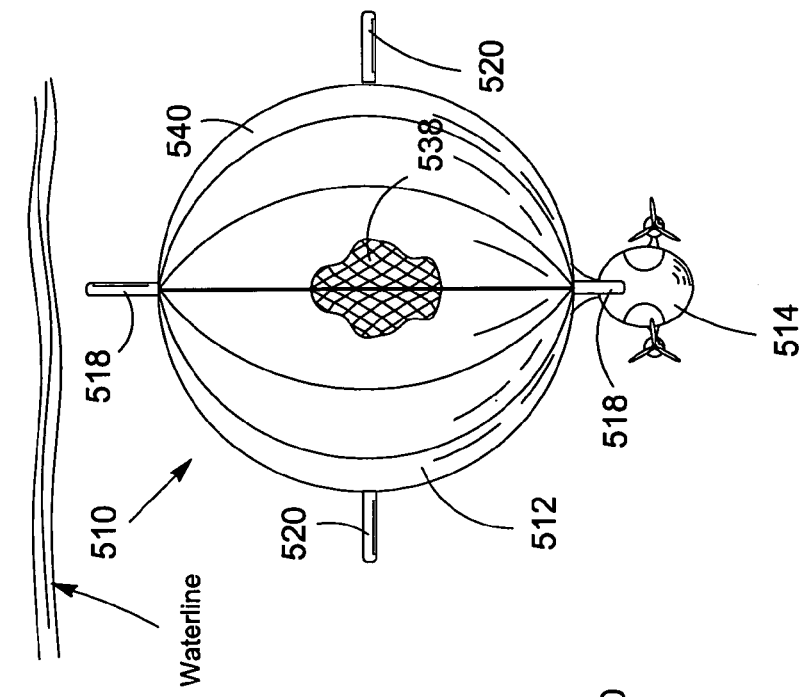
FIG. 13 is a rear view of the seventh embodiment of the present invention, showing the assemblies fully retracted.
Figure 12:
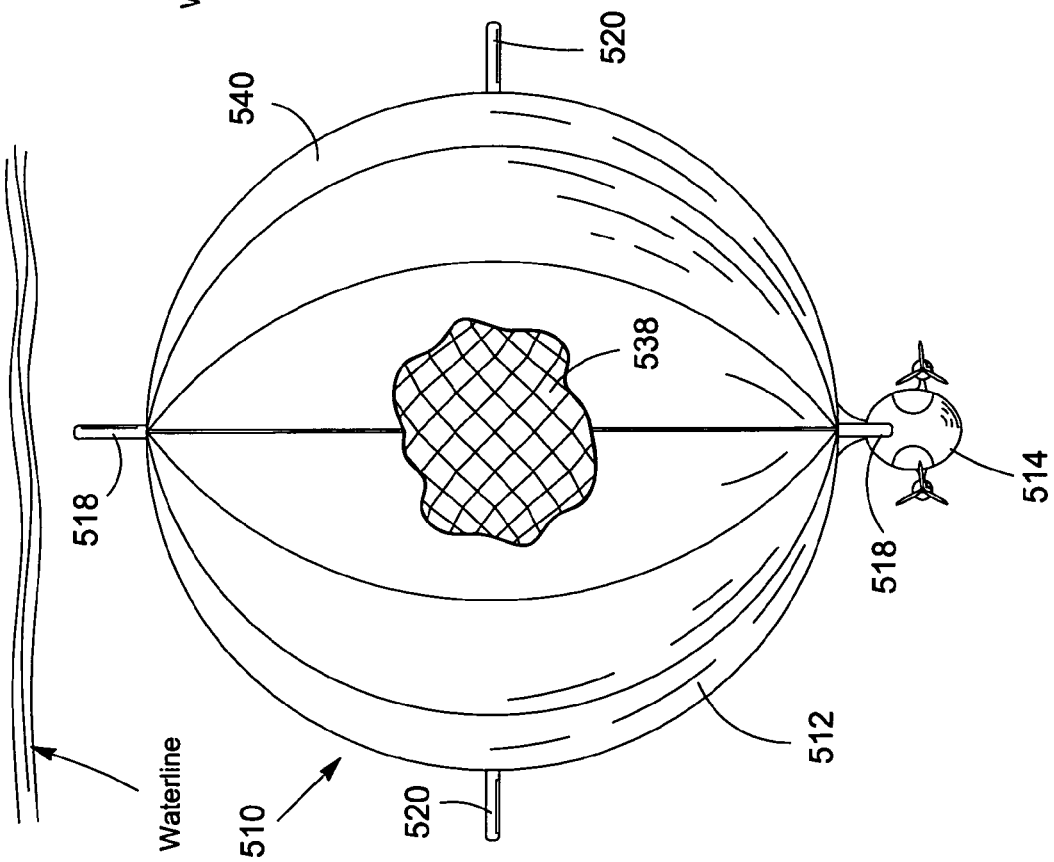
FIG. 12 is a rear view of a seventh embodiment of the present invention mounted on a portion of a hull of a submersible vessel, showing the assemblies fully extended.
Figure 12A:
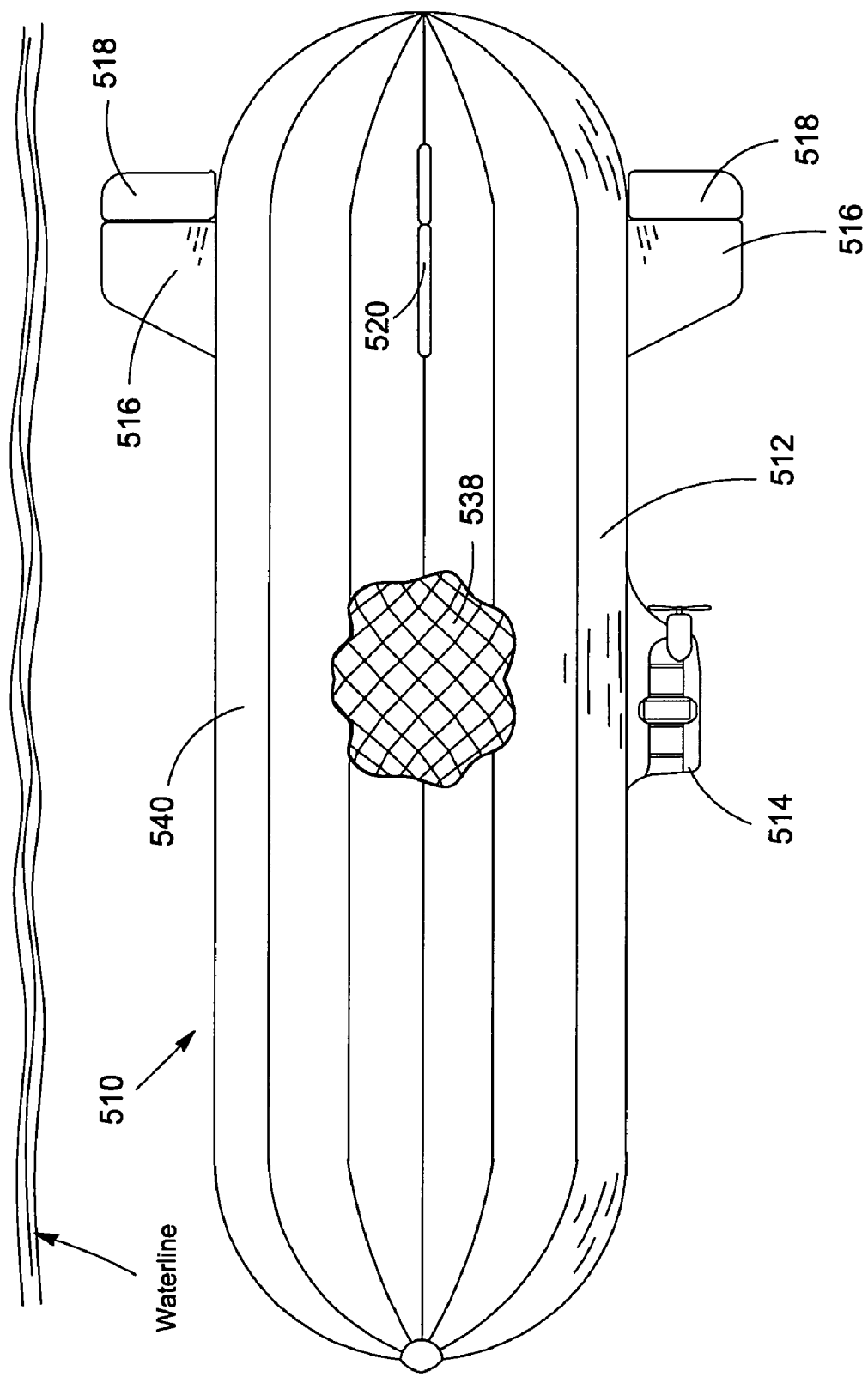
FIG. 12A is a side view of the seventh embodiment of the present invention, showing the assemblies fully extended.

FIGS. 12, 12A, and 13 show a vessel 512 having an ellipsoidal assembly 538 that extends and retracts conformally. FIG. 12 is a rear view of vessel 512 with assembly 538 (shown beneath a cutaway of membrane 540) in a fully expanded configuration. Passenger compartment 514 is connected to the lower portion of the airship. Horizontal stabilizers 520 and vertical stabilizers 516 are connected to the assembly, and move relative to the passenger compartment when the assembly extends or retracts. Fins 518 may be fixed in size or also composed of assemblies 538. They are free to move throughout the desired dynamic range regardless of the extent to which the hull assemblies are extended or retracted. As stated above, a flexible membrane covers the assemblies, is within the assemblies, or both. The membranes may be tight, allowing the less dense fluid to be bounded by the membrane(s), or the less dense fluid may be held in containers within the membrane(s). Vessel 512 can be an airship or a submersible.

Figure 15:
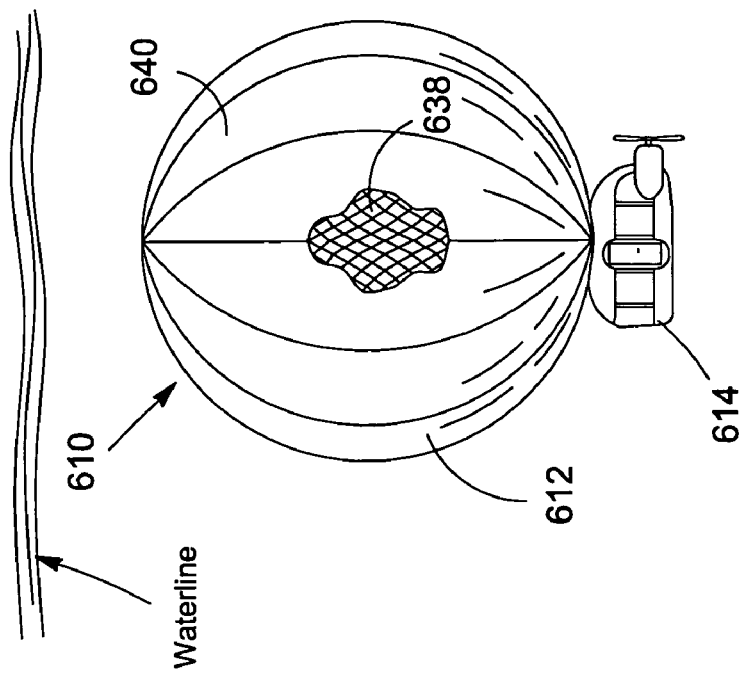
Figure 14:
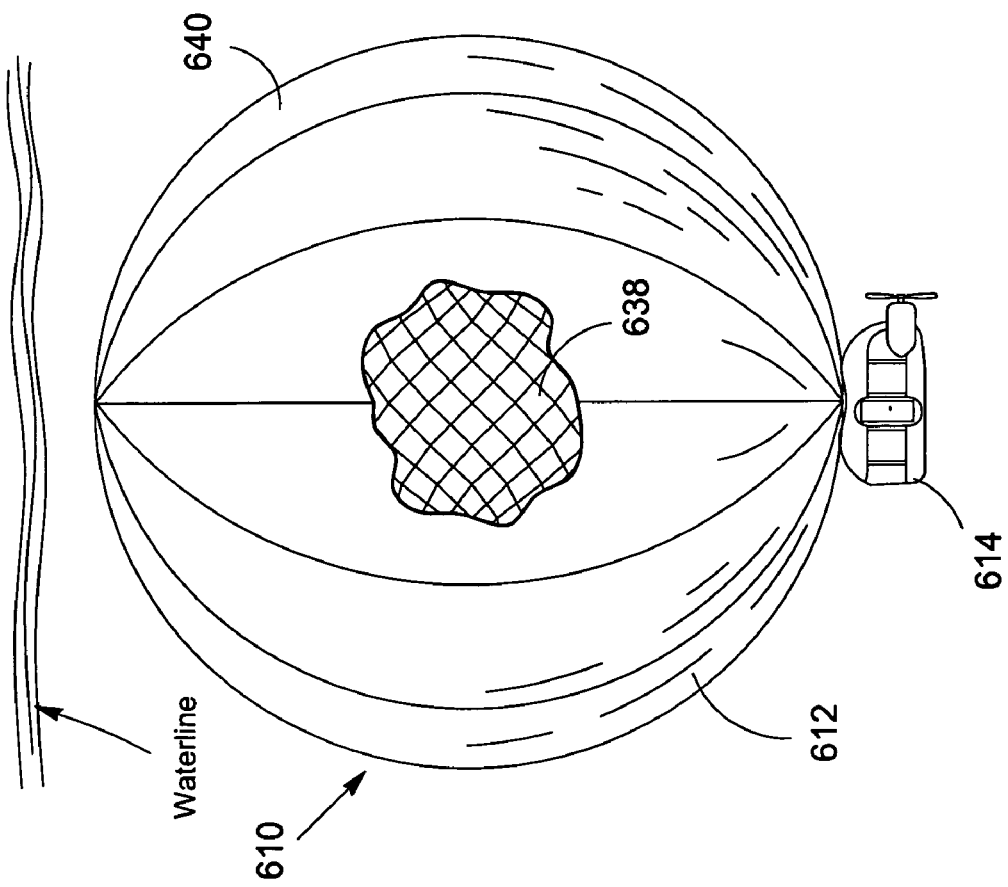
FIG. 14 is a front view of an eighth embodiment of the present invention mounted on a portion of a hull of a submersible vessel, showing the spherical assembly fully extended; and, FIG. 15 is a front view of the eighth embodiment of the present invention, showing the spherical assembly fully retracted.

FIGS. 14 and 15 show vessel 612 comprising a spherical hull 610. The spherical hull is an assembly 638 (shown beneath a cutaway of membrane 640) covered by membrane 640. Passengers may be carried within compartment 614. As with previous embodiments, the less dense fluid may be contained within fluid tight membranes covering, within, or both covering and within the assembly. The less dense fluid may instead be held within containers within the hull. Vessel 612 can be an airship or a submersible.

The truss assemblies shown in FIGS. 1–15 form arcuate shapes. In particular, the truss assemblies shown in these figures form a curved shape in two mutually orthogonal planes. Not only is the membrane 40 curved, but the assembly 38, beneath the membrane 40, is curved. For example, FIGS. 4A–4D show that assembly 38 forms, in an elevation plane, a curved surface. The profile ranges from elliptical to semi-circular, depending on the extent to which assembly 38 is retracted or extended. FIGS. 5A–5C and 6A–6C show that the assemblies are substantially curved in plan view also. FIGS. 7A–7B show the assemblies curved in a perspective view.

In general, the members forming a present invention truss assembly pivot in respective planes substantially coplanar with the portion of a vessel hull formed by the assembly. For example, in FIGS. 4A–4D, the members forming truss 38 rotate about truss joints 802. At each joint 802, the members connected to the joint rotate in a plane that is substantially planar with the surface formed by truss 38. This coplanar rotation also is shown in FIGS. 7A–7C. In particular, the members are shown rotating "beneath" respective plates 44, that is, in substantially the same planes as respective plates 44. Plates 44, in turn, substantially form the planar surface of embodiment 310.

Figure 16B:
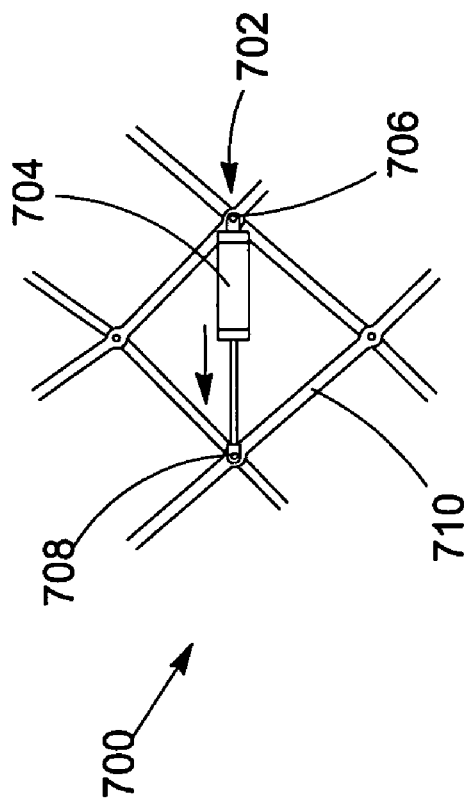
FIG. 16B is a detail of the assembly shown in FIG. 4A, showing a pneumatic or hydraulic extension and retraction means in an extended configuration.
Figure 16A:
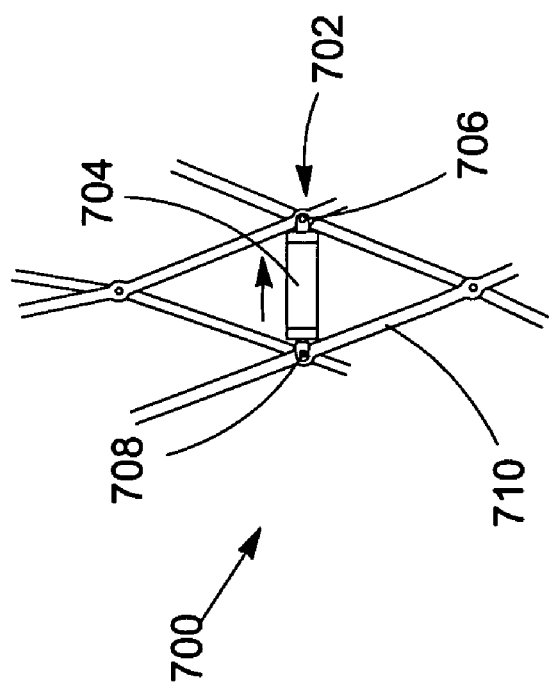
FIG. 16A is a detail of the assembly shown in FIG. 4B, showing a pneumatic or hydraulic extension and retraction means in a retracted configuration.

FIGS. 16A and 16B show an extension and retraction means 700 for the truss assembly shown in FIGS. 4B and 4A, respectively, connected to a truss segment 702 of assembly 38. Means 700 includes a cylinder and piston arrangement 704. Arrangement 704 can be a pneumatic system or a hydraulic system. For the sake of clarity, the ancillary components of arrangement 704, such as fluid reservoirs, piping, and valves are not shown. In some embodiments, arrangement 704 is connected to truss segment 702 at pins 706 and 708. In some embodiments (not shown), truss segment 702 is connected to structural elements, such as element 710. In FIG. 16A, means 700 is retracted, which results in the extended configuration of assembly 38 shown in FIG. 4B. In FIG. 16B, means 700 is extended, which results in the retracted configuration of assembly 38 shown in FIG. 4A.

Figure 16D:
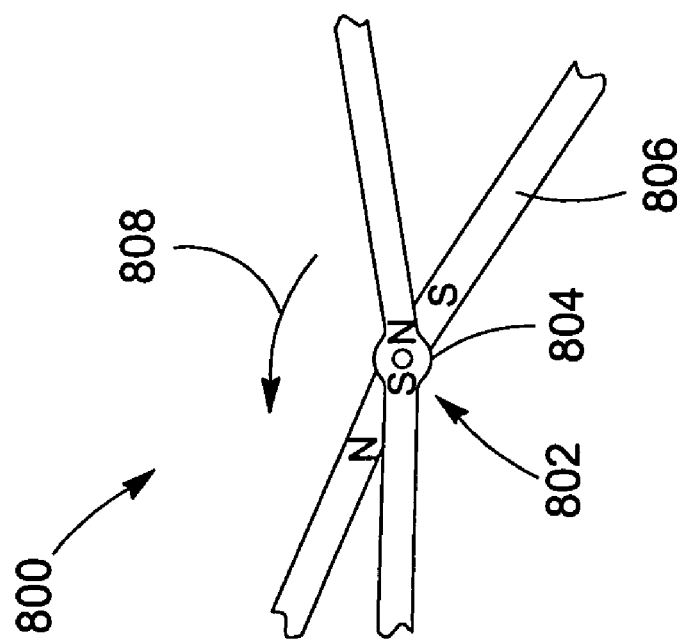
FIG. 16D is a detail of the assembly shown in FIG. 4A, showing a microelectromechanical extension and retraction means with the assembly retracted.
Figure 16C:
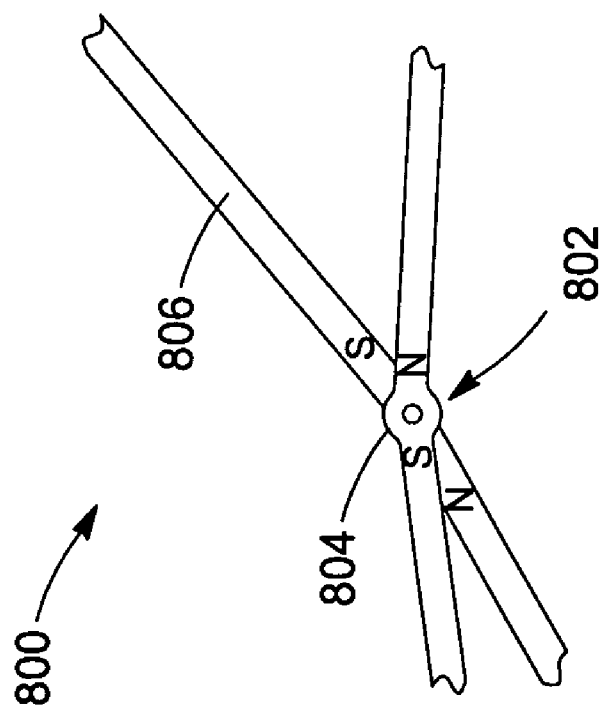
FIG. 16C is a detail of the assembly shown in FIG. 4B, showing a microelectromechanical extension and retraction means with the assembly extended.

FIGS. 16C and 16D show an extension and retraction means 800 for the truss assembly shown in FIGS. 4B and 4A, respectively, associated with a truss joint 802 of assembly 38. FIGS. 16C and 16D show one possible embodiment of a MEMs actuator. However, it should be understood that other types of MEMs actuators, including, but not limited to, linear MEMs actuators, for example, are included within the spirit and scope of the claims. Means 800 is a MEMS actuator. MEMS actuator 800 includes hub 804 and variable pole element 806. As shown in FIGS. 16C and 16D, hub 804 has a fixed north and south magnetic pole configuration. However, the magnetic configuration of element 806 is defined by the direction of electrical current flow as controlled by a switch (not shown). In FIGS. 16C and 16D, the current directions are reversed, resulting in the "flipping" of the north and south magnetic poles in element 806. In FIG. 16C, the north and south poles of hub 804 and the south and north poles, respectively, of element 806 are mutually attracted, causing element 806 to assume the position shown. When the switch is flipped to reverse the direction of the electrical current, element 806 assumes the magnetic configuration shown in FIG. 16D. Reversing the magnetic configuration of element 806 in FIG. 16C causes a magnetic torque 808 as shown in FIG. 16D. For example, switching from the magnetic polarity shown in FIG. 16C to the magnetic polarity shown in FIG. 16D causes the north poles of hub 804 and element 806, which are aligned, to push away from each other, causing element 806 to rotate counterclockwise. At the same time, the mutual attraction of the respective north and south poles of hub 804 and element 806 also causes element 806 to rotate counterclockwise. Thus, element 806 rotates from the position shown in FIG. 16C to the position shown in FIG. 16D. By reversing the direction of the electrical current flow again, element 808 can be made to rotate clockwise from the position shown in FIG. 16D to the position shown in FIG. 16C. By reversing the direction of the electrical current flow again, element 808 can be made to rotate clockwise from the position shown in FIG. 16D to the position shown in FIG. 16C.

Thus, it is seen that the objects of the present invention are efficiently obtained, although modifications and changes to the invention should be readily apparent to those having ordinary skill in the art, and these modifications are intended to be within the spirit and scope of the invention as claimed.

What is claimed is:

1. An apparatus for varying the dimensions of a marine vessel having a buoyant hull comprising:
   an arcuate truss assembly having a plurality of members pivotally joined, said assembly operatively arranged to form a portion of said buoyant hull in contact with water, said truss assembly operatively arranged to extend and retract to vary the dimensions of said hull when said plurality of members are pivoted with respect to one another, said members pivoting in a plane substantially coplanar with said portion of said buoyant hull, and said hull remains buoyant when said assembly is fully retracted; and,
   pneumatic means operatively arranged to extend and retract said assembly.

2. The apparatus recited in claim 1 further comprising a flexible membrane, said membrane connected to said hull around the periphery of said membrane, said membrane operatively arranged to cover said assembly, said membrane operatively arranged to extend and retract as said assembly extends and retracts.

3. The apparatus recited in claim 2 wherein said membrane comprises urethane.

4. The apparatus recited in claim 2 wherein said membrane is connected to said hull with a watertight seal.

5. The apparatus recited in claim 2 wherein said membrane is operatively arranged to retract in a diaphragm shutter like fashion when said assembly is retracted.

6. The apparatus recited in claim 1 further comprising a plurality of plates, said plates operatively arranged to cover said assembly when said assembly is substantially fully extended.

7. The apparatus recited in claim 6 wherein said plates form a watertight seal with said hull when said assembly is substantially fully extended.

8. The apparatus recited in claim 1 wherein said assembly is operatively arranged to extend and retract in a diaphragm shutter like fashion.

9. The apparatus recited in claim 1 wherein said vessel is a waterborne vessel.

10. The apparatus recited in claim 1 wherein said vessel is a submersible vessel.

11. An apparatus for varying the dimensions of a marine vessel having a buoyant hull comprising:
    an arcuate truss assembly having a plurality of members pivotally joined, said assembly operatively arranged to form a portion of said buoyant hull in contact with water, said truss assembly operatively arranged to extend and retract to vary the dimensions of said hull when said plurality of members are pivoted with respect to one another, said members pivoting in a plane substantially coplanar with said portion of said buoyant hull, and said hull remains is buoyant when said assembly is fully retracted; and,
    hydraulic means operatively arranged to extend and retract said assembly.

12. An apparatus for varying the dimensions of a marine vessel having a buoyant hull comprising:
    an arcuate truss assembly having a plurality of members pivotally joined, said assembly operatively arranged to form a portion of said buoyant hull in contact with water, said truss assembly operatively arranged to extend and retract to vary the dimensions of said hull when said plurality of members are pivoted with respect to one another, said members pivoting in a plane substantially coplanar with said portion of said buoyant hull, and said hull remains buoyant when said assembly is fully retracted; and,
    microelectromechanical systems (MEMS) means operatively arranged to extend and retract said assembly.

13. A marine vessel comprising:
    a buoyant hull;
    an arcuate truss assembly having a plurality of members pivotally joined, said truss assembly operatively arranged to form a portion of said buoyant hull in contact with water, said truss assembly operatively arranged to extend and retract to vary the dimensions of said hull when said plurality of members are pivoted with respect to one another, said members pivoting in a plane substantially coplanar with said portion of said buoyant hull, and said hull remains buoyant when said assembly is fully retracted; and,
    pneumatic means operatively arranged to extend and retract said assembly.

14. The vessel recited in claim 13 further comprising a flexible membrane, said membrane connected to said hull around the periphery of said membrane, said membrane operatively arranged to cover said assembly, said membrane operatively arranged to extend and retract as said assembly extends and retracts.

15. The vessel recited in claim 14 wherein said membrane comprises urethane.

16. The vessel recited in claim 14 wherein said membrane is connected to said hull with a watertight seal.

17. The apparatus recited in claim 14 wherein said membrane is operatively arranged to retract in a diaphragm shutter like fashion when said assembly is retracted.

18. The vessel recited in claim 13 further comprising a plurality of plates, said plates operatively arranged to cover said assembly when said assembly is substantially fully extended.

19. The vessel recited in claim 18 wherein said plates form a watertight seal with said hull when said assembly is substantially fully extended.

20. The apparatus recited in claim 13 wherein said assembly is operatively arranged to extend and retract in a diaphragm shutter like fashion.

21. The apparatus recited in claim 13 wherein said vessel is a waterborne vessel.

22. The apparatus recited in claim 13 wherein said vessel is a submersible vessel.

23. A marine vessel comprising:

a buoyant hull;

an arcuate truss assembly having a plurality of members pivotally joined, said truss assembly operatively arranged to form a portion of said buoyant hull in contact with water, said truss assembly operatively arranged to extend and retract to vary the dimensions of said hull when said plurality of members are pivoted with respect to one another, said members pivoting in a plane substantially coplanar with said portion of said buoyant hull, and said hull remains buoyant when said assembly is fully retracted; and, hydraulic means operatively arranged to extend and retract said assembly.

24. A marine vessel comprising:

a buoyant hull;

an arcuate truss assembly having a plurality of members pivotally joined, said truss assembly operatively arranged to form a portion of said buoyant hull in contact with water, said truss assembly operatively arranged to extend and retract to vary the dimensions of said hull when said plurality of members are pivoted with respect to one another, said members pivoting in a plane substantially coplanar with said portion of said buoyant hull, and said hull remains buoyant when said assembly is fully retracted; and, microelectromechanical systems (MEMS) means operatively arranged to extend and retract said assembly.

* * * * *